(12) United States Patent
Katagiri et al.

(10) Patent No.: US 12,353,655 B1
(45) Date of Patent: *Jul. 8, 2025

(54) TOUCH SENSOR WITH PRESSURE SENSITIVE ADHESIVE LAYER, TOUCH PANEL, AND IMAGE DISPLAY DEVICE

(71) Applicant: FUJIFILM Corporation, Tokyo (JP)

(72) Inventors: Kensuke Katagiri, Kanagawa (JP); Tianhua Ouyang, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,954

(22) Filed: Oct. 10, 2024

(30) Foreign Application Priority Data

Feb. 29, 2024 (JP) .................................. 2024-030303
May 29, 2024 (JP) .................................. 2024-087068

(51) Int. Cl.
*G06F 3/041* (2006.01)
*G01L 1/14* (2006.01)

(52) U.S. Cl.
CPC ................ *G06F 3/041* (2013.01); *G01L 1/14* (2013.01); *G06F 2203/04105* (2013.01)

(58) Field of Classification Search
CPC ... G06F 3/041; G06F 2203/04105; G01L 1/14
See application file for complete search history.

(56) References Cited

U.S. PATENT DOCUMENTS 9,760,193 B2    9/2017  Hsu et al.
2015/0248182 A1 *  9/2015  Hsu ......................... G06F 3/041
                                                428/408

FOREIGN PATENT DOCUMENTS

| CN | 206348771 U | 7/2017 |
| JP | 2000-149664 A | 5/2000 |
| JP | 2000-194503 A | 7/2000 |
| JP | 2015-165401 A | 9/2015 |
| JP | 2016-138234 A | 8/2016 |
| JP | 2017-141442 A | 8/2017 |
| JP | 2017-182285 A | 10/2017 |

OTHER PUBLICATIONS

Office Action issued in Japanese Patent Application No. 2024-092907 on Jul. 30, 2024.

* cited by examiner

*Primary Examiner* — Temesghen Ghebretinsae
*Assistant Examiner* — Sosina Abebe
(74) *Attorney, Agent, or Firm* — Edwards Neils LLC; Jean C. Edwards, Esq.

(57) ABSTRACT

A touch sensor with a pressure sensitive adhesive layer that is excellent in contrast between black display and white display and is excellent in performance of suppressing a decrease in brightness of white display when the touch sensor with a pressure sensitive adhesive layer is applied to an image display device and black and white display is made, as well as an image display device including the touch sensor with a pressure sensitive adhesive layer. The touch sensor with a pressure sensitive adhesive layer includes a touch sensor and a pressure sensitive adhesive layer disposed on one surface side of the touch sensor. The pressure sensitive adhesive layer includes a visible light absorber and has an internal absorbance $A_a$ of 0.03 or less and a parameter X of 20 m$^{-1}$ or more, the internal absorbance $A_a$ being calculated with Test X.

10 Claims, 1 Drawing Sheet

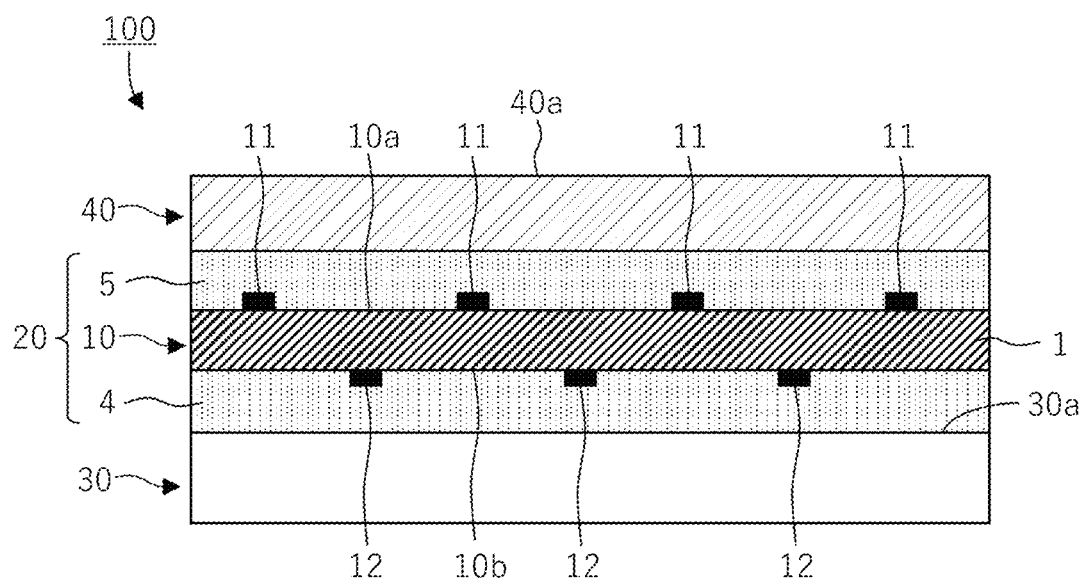

TOUCH SENSOR WITH PRESSURE SENSITIVE ADHESIVE LAYER, TOUCH PANEL, AND IMAGE DISPLAY DEVICE

CROSS-REFERENCE TO RELATED APPLICATIONS

The present application claims priority under 35 U.S.C. § 119 to Japanese Patent Application No. 2024-030303 filed on Feb. 29, 2024 and Japanese Patent Application No. 2024-087068 filed on May 29, 2024. Each of the above applications is hereby expressly incorporated by reference, in its entirety, into the present application.

BACKGROUND OF THE INVENTION

The present invention relates to a touch sensor with a pressure sensitive adhesive layer, touch panel, and an image display device.

Conventionally, in various electronic devices including portable information devices such as tablet computers and smartphones, a touch sensor that senses a so-called touch operation in which a finger or a stylus pen is brought into contact with or close to a screen is used. Such a touch sensor is usually formed on a surface of a substrate and includes a sensing electrode that senses a touch operation.

For example, JP 2017-182285 A discloses: a conductive film including a substrate and a conductor wire provided on at least one surface of the substrate, in which the conductor wire includes a metal layer and a visibility suppression layer, and the visibility suppression layer includes a transparent layer, a chromium-containing layer, and a transparent layer in this order; and a touch panel.

SUMMARY OF THE INVENTION

There have been increasing examples in which an image display element appealing with high contrast is used in an image display device formed by laminating a touch sensor on the image display element in recent years. The present inventors have intensively conducted studies on display performance of an image display device including a touch sensor with reference to a technique disclosed in JP 2017-182285 A, and resultantly found that when black and white display in which white and black are simultaneously displayed is made, the brightness of a black display portion adjacent to a white display portion tends to increase and the contrast tends to decrease, as compared with an image display device not including a touch sensor.

In view of the above circumstances, an object of the present invention is to provide a touch sensor with a pressure sensitive adhesive layer that is excellent in contrast between black display and white display and is excellent in performance of suppressing a decrease in brightness of white display when the touch sensor with a pressure sensitive adhesive layer is applied to an image display device and black and white display is made. Another object of the present invention is to provide an image display device including the touch sensor with a pressure sensitive adhesive layer.

The present inventors have made intensive studies to solve the above problem, and as a result, have completed the present invention. That is, the present inventors have found that the above problem is solved by the following configuration.

[1]
A touch sensor with a pressure sensitive adhesive layer, comprising: a touch sensor, and a pressure sensitive adhesive layer disposed on one surface side of the touch sensor, wherein the pressure sensitive adhesive layer includes a visible light absorber, and the pressure sensitive adhesive layer has an internal absorbance $A_a$ of 0.03 or less and a parameter X of 20 m$^{-1}$ or more, the internal absorbance $A_a$ being calculated with Test X to be described later.

[2]
The touch sensor with a pressure sensitive adhesive layer according to [1], wherein a thickness of the pressure sensitive adhesive layer is 300 μm or less.

[3]
The touch sensor with a pressure sensitive adhesive layer according to [1] or [2], wherein the visible light absorber is a black pigment, and a content of the black pigment is 5 to 200 mass ppm with respect to a total mass of the pressure sensitive adhesive layer.

[4]
The touch sensor with a pressure sensitive adhesive layer according to any one of [1] to [3], wherein a thickness of the pressure sensitive adhesive layer is 300 μm or less, the visible light absorber is a black pigment, and a content of the black pigment is 5 to 200 mass ppm with respect to a total mass of the pressure sensitive adhesive layer.

[5]
A touch panel comprising the touch sensor with a pressure sensitive adhesive layer according to any one of [1] to [4].

[6]
An image display device comprising: an image display element; and the touch sensor with a pressure sensitive adhesive layer according to any one of [1] to [4].

[7]
The image display device according to [6], wherein the image display element is an organic electroluminescence display element.

According to the present invention, it is possible to provide a touch sensor with a pressure sensitive adhesive layer that is excellent in contrast between black display and white display and is excellent in performance of suppressing a decrease in brightness of white display when the touch sensor with a pressure sensitive adhesive layer is applied to an image display device and black and white display is made. Further, according to the present invention, it is possible to provide an image display device including the touch sensor with a pressure sensitive adhesive layer.

BRIEF DESCRIPTION OF THE DRAWINGS

FIG. 1 is a cross-sectional view schematically illustrating an example of an image display device including a touch sensor with a pressure sensitive adhesive layer according to the present invention.

DESCRIPTION OF THE PREFERRED EMBODIMENTS

Hereinafter, a touch sensor with a pressure sensitive adhesive layer and an image display device according to the present invention are described in detail with reference to the drawing.

The description of the configuration requirements described below is made based on representative embodiments of the present invention, and the present invention is not limited only to such embodiments. In addition, the drawing is provided as an example to describe the present invention, and the scale of each component may be changed from the actual scale in order to facilitate visual recognition or description.

In the present specification, a numerical range represented using "to" means a range including numerical values described before and after "to" as a lower limit and an upper limit.

In the present specification, when a component includes two or more types, the "content" of the component means the total content of the two or more types.

As to the angle, "orthogonal" or "vertical" means a range of 90°±5°, and "parallel" means a range of 0°±5°. Similarly, an angle represented by a specific numerical value means that a difference from an exact angle is within 5° unless otherwise specified. The difference between the exact angle and the above orthogonal, vertical, or parallel, or the above angle is preferably 4° or less, and more preferably 3° or less.

The "polymer" means a compound having a weight average molecular weight of 2,000 or more. The weight average molecular weight herein is defined as a polystyrene equivalent value measured under the following conditions using gel permeation chromatography (GPC).

Apparatus: HLC-8320GPC manufactured by TOSOH CORPORATION
Column: TSK-GEL G3000PWXL manufactured by TOSOH CORPORATION
Column temperature: 35° C.
Flow rate: 0.5 mL/min
Calibration curve: POLY SODIUM ACRYLATE STANDARD made by Sowa Science Corporation
Eluent: a solution prepared by diluting a mixture of sodium dihydrogen phosphate 12-hydrate/disodium hydrogen phosphate dihydrate (34.5 g/46.2 g) to 5,000 g with pure water The "main surface" means a surface having the largest area in a film-like, sheet-like, or plate-like member.

The "visible light" means light in a wavelength range of 380 to 780 nm.

The "transparent" means that the light transmittance in the wavelength range of visible light is 40% or more, preferably 60% or more, more preferably 80% or more, and still more preferably 90% or more. The light transmittance is measured according to "Plastics-Determination of total luminous transmittance and reflectance" defined in JIS K 7375:2008 using a known transmittance measuring device.

In the present specification, the "acrylic resin" is used to mean one or both of a polymer and a copolymer containing a unit derived from at least one monomer selected from the group consisting of an acrylate and a methacrylate.

[Touch Sensor with Pressure Sensitive Adhesive Layer]

The touch sensor with a pressure sensitive adhesive layer according to the present invention includes a touch sensor and a pressure sensitive adhesive layer disposed on one surface side of the touch sensor.

Hereinafter, the touch sensor with a pressure sensitive adhesive layer according to the present invention is described in detail with reference to the drawing.

FIG. 1 is a cross-sectional view schematically illustrating an example of an image display device including the touch sensor with a pressure sensitive adhesive layer according to the present invention.

In an image display device 100 illustrated in FIG. 1, an image display element 30, a touch sensor 20 with a pressure sensitive adhesive layer according to the present invention, and a protective layer 40 are laminated in this order in a lamination direction. The touch sensor 20 with a pressure sensitive adhesive layer according to the present invention includes a touch sensor 10, a pressure sensitive adhesive layer 4 disposed on a surface 10b of the touch sensor 10 on the image display element 30 side, and a pressure sensitive adhesive layer 5 disposed on a surface 10a of the touch sensor 10 on the protective layer 40 side.

The touch sensor 10 includes a substrate 1, sensing electrodes 11 disposed on one surface of the substrate 1, and sensing electrodes 12 disposed on the other surface of the substrate 1. As illustrated, the pressure sensitive adhesive layer 5 is disposed to cover the sensing electrodes 11 on the surface 10a of the touch sensor 10, and the pressure sensitive adhesive layer 4 is disposed to cover the sensing electrodes 12 on the surface 10b of the touch sensor 10.

In the image display device 100, an image (not illustrated) displayed on a display surface 30a of the image display element 30 is visually recognized through the touch sensor 20 with a pressure sensitive adhesive layer and the protective layer 40. A surface 40a of the protective layer 40 on the side opposite to the touch sensor 10 is a touch surface of the image display device 100 and serves as an operation surface.

The touch sensor with a pressure sensitive adhesive layer according to the present invention is characterized in comprising: a touch sensor; and a pressure sensitive adhesive layer disposed on one surface side of the touch sensor and having an internal absorbance $A_a$ of 0.03 or less and a parameter X of 20 m$^{-1}$ or more, the internal absorbance $A_a$ being calculated with Test X to be described later.

The mechanism in which the touch sensor with a pressure sensitive adhesive layer according to the present invention is excellent in contrast between black display and white display and excellent in performance of suppressing a decrease in brightness of white display when the touch sensor with a pressure sensitive adhesive layer is applied to an image display device and black and white display is made is not necessarily clear, but the present inventors presume as follows.

The present inventors have intensively conducted studies on the above-described problem of a decrease in contrast in an image display device including a touch sensor laminated on an image display element, and resultantly found that, since an increase in brightness of black display is observed even in a dark room where no external light beam exists, an increase in brightness of black display and a decrease in contrast are not caused by reflection of an external light beam. Further studies have been conducted, and it has been presumed that the cause of the above could be that part of light emitted from a white display portion is transmitted or propagated in a pressure sensitive adhesive layer used in laminating the touch sensor on the image display element due to scattering, reflection, or the like, to travel toward a black display portion adjacent to the white display portion, and reaches the place observed by the observer, and as a result, the brightness of black display increases.

Based on this presumed mechanism, the present inventors have found that an increase in brightness of black display displayed adjacent to white display can be significantly suppressed and contrast between black display and white display can be improved by adding a visible light absorber to a pressure sensitive adhesive layer disposed on a surface of a touch sensor to reduce light transmitted or propagated through the inside of the pressure sensitive adhesive layer.

Further, in the touch sensor with a pressure sensitive adhesive layer according to the present invention, the internal absorbance $A_a$ of a pressure sensitive adhesive layer measured by a predetermined test method and the parameter X are each defined to be in a predetermined range. With this configuration, the decrease in light emitted from the image display element in the white display portion can be suppressed, and the contrast can be improved almost without impairing the brightness of the white display; therefore, display characteristics comparable to those of an image display device including no touch sensor can be realized, according to our presumption.

In the present specification, the expression "the effect of the present invention is excellent" means that at least one of the contrast between black display and white display and the performance of suppressing a decrease in brightness of white display when the touch sensor with a pressure sensitive adhesive layer is applied to an image display device and black and white display is made is excellent.

Hereinafter, each member included in the touch sensor with a pressure sensitive adhesive layer according to the present invention is described in further detail.

A pressure sensitive adhesive layer disposed on one surface side of a touch sensor, including a visible light absorber, and having an internal absorbance $A_a$ of 0.03 or less and a parameter X of 20 m$^{-1}$ or more is hereinafter also called "specific pressure sensitive adhesive layer."

<Specific Pressure Sensitive Adhesive Layer>

The specific pressure sensitive adhesive layer has an internal absorbance $A_a$ calculated with the following Test X of 0.03 or less and a parameter X of 20 m$^{-1}$ or more.

Test X: A visible light reflectance $\rho_0$ of a support white plate is obtained by the method described in JIS R 3106:2019. Similarly, a visible light reflectance $\rho_x$ of the laminate is obtained by making measurement light incident on a laminate formed by laminating the support white plate and a pressure sensitive adhesive layer from the pressure sensitive adhesive layer side of the laminate by the method described in JIS R 3106:2019. The internal absorbance $A_a$ of the pressure sensitive adhesive layer is calculated from the obtained visible light reflectance $\rho_0$ and visible light reflectance $\rho_x$ by formula (1) below. The parameter X (m$^{-1}$) is calculated from the calculated internal absorbance $A_a$ and a thickness $D_a$ (m) of the pressure sensitive adhesive layer by formula (2) below.

$$A_a=-\log_{10}\{(\rho_x/\rho_0)^{0.5}\} \quad \text{Formula (1):}$$

$$X=A_a/D_a. \quad \text{Formula (2):}$$

As the support white plate, one commercially available as a standard white plate (perfect diffuser) for measurement of total light spectral reflectance can be used. More specifically, for example, a barium sulfate plate, a Spectralon standard reflector, or the like can be used. A support white plate formed by combining a support substrate having a light transmittance of 93% or more with the standard white plate may be optionally used. When a transparent support is combined with the standard white plate, the transparent support is laminated on the standard white plate, and measurement light is made incident on the transparent support side to thereby measure the visible light reflectance $\rho_0$.

Here, when the ratio of the optical intensity of the emitted light to the optical intensity of the incident light when visible light is made incident on the pressure sensitive adhesive layer is defined as an internal transmittance $T_a$ of the pressure sensitive adhesive layer, the internal absorbance $A_a$ of the pressure sensitive adhesive layer is represented by formula (3) below.

$$A_a=-\log_{10}(T_a) \quad \text{Formula (3):}$$

From the measurement method of Test X, the internal transmittance $T_a$ of the pressure sensitive adhesive layer, the visible light reflectance $\rho_x$ of the laminate, and the visible light reflectance $\rho_0$ of the support white plate can be considered to satisfy the relationship of formula (4) below.

$$\rho_x=T_a \times \rho_0 \times T_a \quad \text{Formula (4):}$$

Formula (1) is established from formula (3) and formula (4). In this manner, the internal absorbance $A_a$ of the pressure sensitive adhesive layer can be determined from the visible light reflectance $\rho_x$ of the laminate and the visible light reflectance $\rho_0$ of the support white plate using formula (1).

The visible light reflectance $\rho_0$ of the support white plate and the visible light reflectance $\rho_x$ of the laminate are obtained according to the measurement method and the calculation method of the visible light reflectance described in JIS R 3106:2019.

A more specific method for performing Test X is described in examples below.

The internal absorbance $A_a$ of the pressure sensitive adhesive layer represents the degree of attenuation of light inside the pressure sensitive adhesive layer, and reflection on both main surfaces of the pressure sensitive adhesive layer does not affect the internal absorbance $A_a$ or the parameter X. It is presumed that by setting the internal absorbance $A_a$ and the parameter X within the above ranges, an increase in brightness of black display due to transmission and propagation of light inside the pressure sensitive adhesive layer can be suppressed while the brightness of white display transmitted along the lamination direction of the touch sensor with a pressure sensitive adhesive layer is maintained, and the contrast between black display and white display can be improved.

The internal absorbance $A_a$ is preferably 0.0004 to 0.0300 and more preferably 0.0010 to 0.0050 from the viewpoint that the effect of the present invention is more excellent.

The internal absorbance $A_a$ can be adjusted by, for example, the type and content of the visible light absorber added to the specific pressure sensitive adhesive layer, the type of a pressure sensitive adhesive forming the specific pressure sensitive adhesive layer, the thickness of the specific pressure sensitive adhesive layer, and the like.

The parameter X is preferably 20 to 3,000 m$^{-1}$ and more preferably 60 to 1,000 m$^{-1}$ from the viewpoint that the effect of the present invention is more excellent.

The parameter X can be adjusted by, for example, the type and content of the visible light absorber added to the specific pressure sensitive adhesive layer, the type of a pressure sensitive adhesive forming the specific pressure sensitive adhesive layer, the thickness of the specific pressure sensitive adhesive layer, and the like.

The configuration and components of the specific pressure sensitive adhesive layer are not particularly limited as long as the specific pressure sensitive adhesive layer includes the visible light absorber and has a function of fixing a touch sensor and another member together.

It is preferable for the specific pressure sensitive adhesive layer to be transparent and have electrical insulation properties.

The relative permittivity at a frequency of 100 kHz of the specific pressure sensitive adhesive layer is preferably 4.0 or less, more preferably 3.5 or less, and even more preferably 3.0 or less. The lower limit is not particularly limited and may be 2.0 or more.

When the relative permittivity of the specific pressure sensitive adhesive layer is 4.0 or less, the performance of blocking the influence of electromagnetic noise from members such as an image display element is more excellent. The relative permittivity is determined according to JIS K 6911: 2006.

(Visible Light Absorber)

The visible light absorber contained in the specific pressure sensitive adhesive layer need only be a substance having an absorption wavelength characteristic of absorbing visible light (wavelength: 380 to 780 nm), and for example, a substance having a maximum absorption wavelength of 380 to 780 nm may be used.

Examples of the visible light absorber include a dye and a pigment, and a pigment is preferable, and a black pigment is more preferable. Examples of the material forming the visible light absorber include a carbon material, an organic material, an inorganic oxide, an inorganic nitride, and an inorganic oxynitride.

Examples of the black pigment include carbon black, graphite, aniline black, cyanine black, black iron oxide, chromium oxide, manganese oxide, titanium nitride, and titanium oxynitride, and titanium nitride or titanium oxynitride is preferable.

As the pigment, a particulate pigment can be used, and the shape thereof is not particularly limited.

From the viewpoint of preventing the display function of the display from being impaired by light scattering, the average primary particle size of the pigment is preferably 500 nm or less, more preferably 200 nm or less, and still more preferably 100 nm or less. The lower limit is not particularly limited, but is preferably 10 nm or more.

The average primary particle size of the pigment is obtained as an average value by measuring the sphere equivalent diameters of 100 objects and arithmetically averaging the measured values. The sphere equivalent diameter means a diameter of a spherical particle having the same volume. However, when a commercially available pigment is used, the catalog value is preferentially adopted as the average primary particle size.

As the visible light absorber, one type may be used alone, or two or more types may be used in combination.

The content of the visible light absorber (preferably a black pigment) is preferably 0.1 to 500 mass ppm and more preferably 5 to 200 mass ppm with respect to the total mass of the specific pressure sensitive adhesive layer from the viewpoint that the effect of the present invention is more excellent.

The specific pressure sensitive adhesive layer preferably includes a pressure sensitive adhesive.

Examples of the pressure sensitive adhesive used in the specific pressure sensitive adhesive layer include an optically clear adhesive (OCA) and an optically clear resin (OCR) such as an ultraviolet (UV) curable resin.

Examples of the OCA and the OCR include a (meth)acrylic resin, a urethane acrylate-based resin, a urethane-based resin, a rubber-based resin, an epoxy-based resin, an epoxy acrylate-based resin, an oxetane-based resin, a silicone-based resin, a silicone acrylic resin, a polyester-based resin, a polyether-based resin (e.g., polyvinyl ether), a polyamide-based resin, a fluororesin, a vinyl acetate-vinyl chloride copolymer, and modified polyolefin. Of the foregoing resins, one type may be used alone, or two or more types may be used in combination. In particular, (meth)acrylic resin is preferred in terms of the weather resistance and the cost.

The content of the pressure sensitive adhesive in the specific pressure sensitive adhesive layer is preferably 85 mass % or more and more preferably 90 mass % or more with respect to the total mass of the specific pressure sensitive adhesive layer. The upper limit is not particularly limited and may be 99 mass % or less, for instance. The content of the pressure sensitive adhesive in the specific pressure sensitive adhesive layer may be the balance excluding the visible light absorber and an optional additive.

The specific pressure sensitive adhesive layer may optionally include an additive as long as the function as the pressure sensitive adhesive layer or the effect of the invention is not impaired.

Examples of the additive include a cross-linking agent, an ultraviolet absorber, a plasticizer, an antistatic agent, and a corrosion inhibitor.

The thickness $D_a$ of the specific pressure sensitive adhesive layer is preferably 500 µm or less, more preferably 300 µm or less, even more preferably 150 µm or less, and particularly preferably 100 µm or less from the viewpoint that the effect of the present invention is more excellent. The lower limit is not particularly limited and may be 10 µm or more for instance. The thickness $D_a$ of the pressure sensitive adhesive layer can be measured using a linear gauge (for example, manufactured by Mitutoyo Corporation). The method for measuring the thickness $D_a$ of the pressure sensitive adhesive layer is described in detail in examples below.

Various known methods can be applied as the method for forming the specific pressure sensitive adhesive layer.

Examples of the method for forming the specific pressure sensitive adhesive layer include a method in which a pressure sensitive adhesive composition containing the visible light absorber and the pressure sensitive adhesive is applied to a surface of a touch sensor on the side having a sensing electrode, thus forming the specific pressure sensitive adhesive layer (application method), and a method in which the specific pressure sensitive adhesive layer is formed on a temporary support using the above pressure sensitive adhesive composition and then transferred onto a surface of a touch sensor on the side having a sensing electrode (transferring method).

Of these, the transferring method is preferred because this makes it possible to produce and inspect the touch sensor and the specific pressure sensitive adhesive layer separately, so that non-defective products of those can be used, resulting in higher yield of the touch sensor with a pressure sensitive adhesive layer.

A coating film of the pressure sensitive adhesive composition formed on a surface of the touch sensor or the temporary support may be optionally subjected to a drying treatment. Known methods can be applied as the method of applying the pressure sensitive adhesive composition and the drying treatment for the coating film.

The pressure sensitive adhesive composition used in formation of the pressure sensitive adhesive layer contains, for instance, the pressure sensitive adhesive and the visible light absorber. The pressure sensitive adhesive composition may contain those additives mentioned above. The pressure sensitive adhesive composition may further contain a solvent, a surfactant, and an application aid such as a thickening agent. The pressure sensitive adhesive composition preferably further contains a solvent. Examples of the solvent include water and an organic solvent, and a solvent capable of dissolving or dispersing components such as the pressure sensitive adhesive and the visible light absorber is suitably selected.

When the pressure sensitive adhesive composition contains the solvent, the solid concentration of the pressure sensitive adhesive composition is preferably 5 to 60 mass % and more preferably 10 to 50 mass %. The "solid" of the pressure sensitive adhesive composition means a component being a constituent of the pressure sensitive adhesive layer formed using the pressure sensitive adhesive composition, and when the pressure sensitive adhesive composition contains the solvent, the "solid" means all the components except for the solvent. Even a liquid component is considered as a solid as long as it is a constituent component of the pressure sensitive adhesive layer.

<Touch Sensor>

The touch sensor is not particularly limited as long as it is an element that functions as a sensor sensing a touch operation, and examples thereof include a conductive substrate having a substrate and a sensing electrode disposed on at least one surface of the substrate.

A specific example of the touch sensor is the touch sensor 10 including the substrate 1, the sensing electrodes 11 disposed on one surface of the substrate 1, and the sensing electrodes 12 disposed on the other surface of the substrate 1, as illustrated in FIG. 1.

The touch sensor is not limited to the embodiment illustrated in FIG. 1. For instance, the sensing electrode may be disposed only on one surface of the substrate.

(Substrate)

The substrate is a member having a function of supporting a sensing electrode.

The substrate is not particularly limited, but a resin substrate is preferable.

Examples of the material forming the substrate include a polyester resin such as polyethylene terephthalate (PET) or polyethylene naphthalate (PEN), a diacetate resin, a triacetate resin, an acrylic resin, a polycarbonate resin, triacetyl cellulose, polystyrene, polyolefin, a polyurethane-based resin, polyvinyl chloride, a polyimide resin, and a polyamide resin.

The substrate is preferably a film made of a polyester resin from the viewpoint of ease of production, and polyethylene terephthalate, polyethylene-2,6-naphthalate, or poly(1,4-cyclohexylenedimethylene terephthalate) is more preferred from the viewpoint of a balance between mechanical properties and cost.

The substrate may be a single layer of the resin or a composite film including a plurality of resin layers.

The substrate may further contain an additive such as a light stabilizer, an antioxidant, an ultraviolet absorber, a flame retardant, a lubricant (fine particles), a nucleating agent (crystallization agent), or a crystallization inhibitor in addition to the resin.

The substrate may further contain the visible light absorber.

The substrate may have an undercoat layer on at least one of the two main surfaces. That is, the substrate may have a multilayer structure having a support and an undercoat layer.

When the substrate has a multilayer structure having a support and an undercoat layer, the undercoat layer is preferably disposed on the surface of the substrate on the side having the sensing electrode. The undercoat layer may be disposed on both surfaces of the support.

As the support forming a multilayer structure together with the undercoat layer, the member described above as the substrate can be used.

Exemplary materials forming the undercoat layer include a binder resin and a surfactant.

The thickness of the substrate is, for example, 400 μm or less, preferably 150 μm or less, more preferably 110 μm or less, still more preferably 60 μm or less, and particularly preferably 40 μm or less, and from the viewpoint that the strength of the touch sensor is more excellent, is more preferably 10 μm or more.

When the substrate has the undercoat layer, the thickness of the substrate also includes the thickness of the undercoat layer.

The thickness of the substrate can be measured using a linear gauge (for example, manufactured by Mitutoyo Corporation). The method for measuring the thickness of the substrate is described in detail in examples below.

(Sensing Electrode)

The sensing electrode includes plural conductive thin wires and is a member that functions as a sensor electrode for sensing a touch operation.

The touch sensor preferably has a plurality of sensing electrodes extending along a first direction in a plane on one surface of the substrate and a plurality of sensing electrodes extending along a second direction orthogonal to the first direction in a plane on the other surface of the substrate.

Only one sensing electrode may be disposed on one surface of the substrate. The sensing electrode may be disposed only on one surface of the substrate.

The sensing electrode may have a predetermined pattern formed of conductive thin wires. The pattern formed is not particularly limited and is preferably a mesh shape (mesh pattern). The mesh shape means a shape including plural openings (lattices) formed by intersecting conductive thin wires.

Exemplary shapes of the mesh pattern of the sensing electrode include a geometric shape combining some of triangles such as an equilateral triangle, an isosceles triangle, and a right triangle, quadrangles such as a square, a rectangle, a rhombus, a parallelogram, and a trapezoid, a (regular) n-polygon such as a (regular) hexagon and a (regular) octagon, a circle, an ellipse, a star, and the like. In addition, the shape of one side of the opening may be a curved shape or an arc shape in addition to a linear shape. In the case of adopting an arc shape, for example, as two opposing sides, an outwardly convex arc shape may be adopted, and as the other two opposing sides, an inwardly convex arc shape may be adopted. In addition, the shape of each side may be a wavy line shape in which an outwardly convex arc and an inwardly convex arc are continuous. Of course, the shape of each side may be a sine curve. The mesh pattern is not particularly limited, and may be a random pattern or a regular pattern, or may be a regular mesh pattern in which plural congruent shapes are repeatedly arranged.

The mesh pattern of the sensing electrode is preferably a regular mesh pattern having rhombus or square openings of the same shape. The length L of one side of the opening is preferably 5 to 1,500 μm and more preferably 10 to 1,000 μm from the viewpoint of visibility. When the length of one side of the opening is within the above range, it is possible to maintain good transparency, and when the touch sensor with a pressure sensitive adhesive layer is attached to a display surface of an image display device, a display image can be visually recognized without discomfort.

The aperture ratio of the mesh pattern of the sensing electrode is preferably 90% or more and more preferably 95% or more from the viewpoint of visible light transmittance. The upper limit is not particularly limited, but is, for example, less than 100%. The aperture ratio corresponds to the area ratio of the openings excluding the conductive thin wires in a region where the sensing electrode is provided to the entire region where the sensing electrode is provided.

The mesh pattern of the sensing electrode can be observed and measured using an optical microscope.

The line width of the conductive thin wire forming the sensing electrode is preferably 10 μm or less, and more preferably 5 μm or less from the viewpoint of more excellent visibility. The lower limit is not particularly limited, but is preferably 0.1 µm or more, and more preferably 0.5 µm or more from the viewpoint of more excellent conductivity characteristics of the conductive thin wire.

The height of the conductive thin wire is not particularly limited, and is, for example, 0.1 to 10 µm, and preferably 0.3 to 5 µm.

The line width and height of the conductive thin wire are obtained by selecting conductive thin wires at arbitrary five sites using a scanning electron microscope and arithmetically averaging values corresponding to the measured line widths and heights.

The conductive thin wire preferably contains a metal.

As the metal, silver (metallic silver), copper (metallic copper), gold (metallic gold), nickel (metallic nickel), palladium (metallic palladium), or a mixture of two or more thereof is preferable, silver, copper, or a mixture thereof is more preferable, and silver is still more preferable from the viewpoint of more excellent conductivity. The conductive thin wire may contain only silver as a metal, and it is preferable that the metal be entirely constituted of silver. When the metal is entirely constituted of silver, occurrence of a disconnection failure of the conductive thin wire is reduced. The form of the metal in the conductive thin wire is not limited, and examples thereof include a particulate form and a form in which the metal is layered and is spread in the conductive thin wire.

The conductive thin wire may be a conductive thin wire containing metallic silver and a polymer binder such as gelatin or an acrylic-styrene latex, which is suitable for forming a mesh pattern. When the conductive thin wire contains a polymer binder, metal particles may be present dispersedly in the polymer, or metal particles may be aggregated and present as aggregates in the polymer. The type of polymer is not particularly limited, and a known polymer can be used.

The conductive thin wire may be a metal thin wire made of a metal of aluminum, copper, silver, molybdenum, or titanium, or an alloy thereof. The conductive thin wire may have a laminated structure thereof, and for example, a metal thin wire having a laminated structure of molybdenum/copper/molybdenum, molybdenum/aluminum/molybdenum, or the like can be used.

The conductive thin wire may contain metal oxide particles, a metal paste such as a silver paste or a copper paste, or metal nanowire particles such as silver nanowire or copper nanowire particles.

Other members than the sensing electrode may be disposed on a surface of the substrate.

Examples of other members include an electrode connection terminal formed at an end of the sensing electrode, a peripheral wire electrically connected to the electrode connection terminal, and an external connection terminal electrically connected to the peripheral wire and an external device. These members have a function of transmitting an electric signal sensed by the sensing electrode to an external device.

A dummy electrode as another member may also be disposed on a surface of the substrate.

(Method for Producing Touch Sensor)

The method for producing a touch sensor is not particularly limited as long as the sensing electrode can be formed on a surface of the substrate produced by the above method. As a method for forming a sensing electrode, for example, a sputtering method, a plating method, a silver salt method, a printing method, and the like can be appropriately used.

A method for forming a sensing electrode by a sputtering method is described. First, a copper foil layer is formed by sputtering, and a copper wire is formed from the copper foil layer by photolithography, whereby a sensing electrode can be formed. A copper foil layer may also be formed by so-called vapor deposition instead of sputtering. As the copper foil layer, an electrolytic copper foil can be used in addition to a sputtered copper foil or a deposited copper foil. More specifically, a step of forming a copper wire described in JP 2014-029614 A can be used.

A method for forming a sensing electrode by a plating method is described. For example, an electroless plating base layer is subjected to electroless plating to form a metal plating film on the base layer. This metal plating film can be used as a sensing electrode. In this case, the sensing electrode is formed by forming a catalyst ink containing at least metal fine particles in a pattern shape on a substrate and then immersing the substrate in an electroless plating bath to thereby form a metal plating film. More specifically, a method for producing a metal-coated substrate described in JP 2014-159620 A can be used.

In addition, a sensing electrode is formed by forming a resin composition having at least a functional group capable of interacting with a metal catalyst precursor in a pattern shape on a substrate, thereafter applying a catalyst or a catalyst precursor, and immersing the substrate in an electroless plating bath to thereby form a metal plating film. More specifically, a method for producing a metal-coated substrate described in JP 2012-144761 A can be applied.

A method for forming a sensing electrode by a silver salt method is described. First, a silver salt emulsion layer containing a silver halide is subjected to an exposure treatment using an exposure pattern corresponding to the pattern of a sensing electrode, and then subjected to a development treatment, whereby a sensing electrode can be formed. More specifically, a method for producing a metal thin wire described in JP 2012-006377 A, JP 2014-112512 A, JP 2014-209332 A, JP 2015-022397 A, JP 2016-192200 A, or WO 2016/157585 can be used.

A method for forming a sensing electrode by a printing method is described. First, a conductive paste containing conductive powder is applied to a substrate so as to have the same pattern as that of a sensing electrode, and then subjected to a heat treatment, whereby a sensing electrode can be formed. The pattern formation using the conductive paste is performed by, for example, an inkjet method or a screen printing method. More specifically, as the conductive paste, a conductive paste described in JP 2011-028985 A can be used.

It suffices if the touch sensor with a pressure sensitive adhesive layer according to the present invention has the specific pressure sensitive adhesive layer on one surface of the touch sensor, and a layer other than the specific pressure sensitive adhesive layer may be disposed on the other surface of the touch sensor opposite to the specific pressure sensitive adhesive layer.

An example of another layer is a pressure sensitive adhesive layer other than the specific pressure sensitive adhesive layer, and a pressure sensitive adhesive layer free of a visible light absorber is preferred. That is, an embodiment in which the specific pressure sensitive adhesive layer, the touch sensor, and a pressure sensitive adhesive layer free of a visible light absorber are provided in this order is one of preferred embodiments of the touch sensor with a pressure sensitive adhesive layer.

Materials forming a pressure sensitive adhesive layer free of a visible light absorber and the thickness of the layer, as well as preferred embodiments thereof, may be the same as those of the specific pressure sensitive adhesive layer except that a visible light absorber is not contained.

One exemplary method for producing the touch sensor with a pressure sensitive adhesive layer according to the present invention is a method in which the specific pressure sensitive adhesive layer is formed on one surface of the touch sensor in accordance with the above-described method for forming the specific pressure sensitive adhesive layer. The touch sensor with a pressure sensitive adhesive layer according to the present invention may be produced by other methods.

The touch sensor with a pressure sensitive adhesive layer according to the present invention may be used in the form of a laminate in which another member such as a release sheet is bonded to the specific pressure sensitive adhesive layer during handling and conveyance. The release sheet functions as a protective sheet for preventing occurrence of scratches in the conductive member during conveyance of the laminate. The touch sensor with a pressure sensitive adhesive layer may be handled in the form of, for example, a composite including the touch sensor with a pressure sensitive adhesive layer, and a protective layer disposed in contact with the specific pressure sensitive adhesive layer.

[Touch Panel]

The touch panel of the present invention includes the touch sensor with a pressure sensitive adhesive layer according to the present invention. The touch panel of the present invention can be more suitably used as a capacitive touch panel.

The configuration of the touch panel of the present invention is not particularly limited as long as the touch sensor with a pressure sensitive adhesive layer according to the present invention is included, and for example, the configuration described in "Gekkan Display Bessatsu, Shin Touch Panel Jitsuyou Koza [Monthly display, separate volume, new course for practical use of touch panel]" supervised by Yuji Mitani and Yoshio Itakura (Techno Times, 2011) can be referred to. Further, the configurations disclosed in "Saishin Touch Panel Gijutsu [Latest touch panel technology]" (Techno Times, Jul. 6, 2009), "Technologies and Developments of Touchpanels" supervised by Yuji Mitani (CMC Publishing Co., Ltd., December 2004), FPD International 2009 Forum T-11 lecture textbook, Cypress Semiconductor Corporation, Application Note AN2292, and the like can be applied to the touch panel of the present invention.

The type of the touch panel may be an external type or a display integrated type. Examples of the external type include a film sensor. Examples of the display integrated type include an on-cell type (for example, JP 2013-168125 A, FIG. 19) and other configurations (for example, JP 2013-164871 A, FIG. 6).

The use form of the touch panel of the present invention is not particularly limited, but it is preferably combined with an image display element to form an image display device.

[Image Display Device]

An image display device according to the present invention includes an image display element and the touch sensor with a pressure sensitive adhesive layer according to the present invention. The image display device can be used as a touch panel (capacitive touch panel) owing to an image display element and a touch sensor.

Examples of the configuration of the image display device according to the present invention include an embodiment in which the image display element 30, the touch sensor 20 with a pressure sensitive adhesive layer, and the protective layer 40 are included in this order as in the image display device 100 shown in FIG. 1.

In the image display device, it is preferable that a pressure sensitive adhesive layer disposed on a surface of the touch sensor on the image display element side be the specific pressure sensitive adhesive layer. In other words, in the image display device, an image display element and the touch sensor with a pressure sensitive adhesive layer are preferably disposed in this order.

As the image display element, an element having a display surface for displaying an image and the like can be used, and examples thereof include a liquid crystal display element, an organic electroluminescence display element (OLED), a cathode ray tube (CRT) image display device, a vacuum fluorescent display (VFD), a plasma display panel (PDP), a surface-conduction electron-emitter display (SED), a field emission display (FED), and an electronic paper.

As the image display element, an image display element in a form suitable for the application is appropriately used. An image display element in the form of a panel such as a liquid crystal display panel or an organic electroluminescence display panel is preferable because the image display device can be made thinner.

As illustrated in FIG. 1, the image display device may further have a protective layer on the viewing side of the touch sensor (the side opposite to the image display element). In this case, the surface on the viewing side of the protective layer is the touch surface and the operation surface of the image display device. That is, an input operation is made using the surface on the viewing side of the protective layer as an operation surface. The touch surface means a surface that detects contact of a finger, a stylus pen, or the like. The surface on the viewing side of the protective layer serves as a viewing surface for an image displayed on the display surface of the image display element.

Since the surface of the protective layer is a touch surface, a hard coat layer may be provided on the surface as necessary. The surface of the protective layer is preferably subjected to a treatment for imparting various functions such as an anti-scratch treatment, an anti-glare treatment, an anti-fouling treatment, an anti-fog treatment, and an anti-reflection treatment.

The configuration of the protective layer is not particularly limited, but is preferably transparent so that an image displayed on the display surface of the image display element can be visually recognized. As the protective layer, for example, a plastic film, a plastic plate, a glass plate, or the like is used. The thickness of the protective layer is preferably appropriately selected according to the application. The protective layer made of a glass is called a cover glass.

Examples of the raw material of the plastic film and the plastic plate include polyesters such as polyethylene terephthalate (PET) and polyethylene naphthalate (PEN), polyolefins such as polyethylene (PE), polypropylene (PP), polystyrene, and EVA (polyethylene copolymerized with vinyl acetate), a vinyl-based resin, a polycarbonate (PC), a polyamide, a polyimide, an acrylic resin, triacetyl cellulose (TAC), a cycloolefin-based resin (COP), polyvinylidene fluoride (PVDF), polyarylate (PAR), polyethersulfone (PES), a polymeric acrylic resin, a fluorene derivative, and polymers such as crystalline COP.

As the protective layer, a polarizing plate, a circularly polarizing plate, or the like may be used.

The protective layer is preferably thin from the viewpoint of improving contrast in addition to the viewpoint of weight reduction. Specifically, the thickness of the protective layer is preferably 1 mm or less, more preferably 0.5 mm or less, and still more preferably 0.3 mm or less. The lower limit is not particularly limited, and may be, for example, 0.1 mm or more.

The refractive index of the protective layer is preferably 1.40 to 1.70. The difference in refractive index between the protective layer and other members is preferably 0.1 or less.

The present invention is basically configured as described above. The present invention is not limited to the above embodiments, and various improvements or changes may be made without departing from the gist of the present invention.

EXAMPLES

Hereinafter, the present invention is described in more detail based on examples.

Materials, amounts of use, proportions, details of treatments, treatment procedures, and the like described in the following examples can be appropriately changed without departing from the gist of the present invention. Therefore, the scope of the present invention should not be construed as being limited by the following examples.

Example 1

[Preparation of Pressure Sensitive Adhesive Composition 1]

To ethyl acetate, butyl acrylate (BA) and 2-hydroxyethyl acrylate (2HEA) were added at a mass ratio of 75:25, and azobis(isobutyronitrile) (AIBN) was dissolved as a radical polymerization initiator to thereby obtain a solution. The obtained solution was heated to 60° C. for random copolymerization to obtain an acrylic polymer.

The obtained acrylic polymer, an isocyanate-based cross-linking agent ("CORONATE (registered trademark) L" manufactured by Tosoh Corporation, 75% ethyl acetate solution of trimethylolpropane trimeric adduct of tolylene diisocyanate), a visible light absorber ("UF-8" manufactured by Mitsubishi Materials Electronic Chemicals Co., titanium oxynitride, average primary particle size=20 nm), an ultraviolet absorber 1 ("Tinuvin (registered trademark) 477" manufactured by BASF Japan Ltd., hydroxyphenyl triazine-based compound), an ultraviolet absorber 2 ("Tinuvin (registered trademark) 384-2" manufactured by BASF Japan Ltd., benzotriazole-based compound), and a solvent (ethyl acetate) were mixed to obtain a pressure sensitive adhesive composition 1 having a solid content concentration of 31 mass %.

The content of the cross-linking agent was 0.6 mass %, the content of the visible light absorber was 26 mass ppm, and the total content of the ultraviolet absorbers was 1.00 mass % with respect to the total mass of the solid content of the pressure sensitive adhesive composition 1, and the balance was the acrylic polymer.

[Production of Touch Sensor with Pressure Sensitive Adhesive Layer]

The pressure sensitive adhesive composition 1 was applied to a release-treated surface of a release sheet (heavy separator film manufactured by Mitsubishi Chemical Corporation, polyethylene terephthalate film having been undergone release treatment) to have a thickness $D_a$ after drying of 150 μm. Thereafter, the coating film was dried at 100° C. for 5 minutes to remove the solvent to form a pressure sensitive adhesive sheet having a pressure sensitive adhesive layer.

To a surface of the pressure sensitive adhesive sheet on which the pressure sensitive adhesive layer had been formed, a touch sensor manufactured by a method described in Example 1 of JP 2022-161790 A was bonded, thus obtaining a touch sensor 1 with a pressure sensitive adhesive layer of Example 1.

Example 2

A pressure sensitive adhesive composition 2 was prepared in the same manner as the preparation method for the pressure sensitive adhesive composition 1 of Example 1 except that the amount of the visible light absorber added was adjusted such that the content of the visible light absorber was 16.5 mass ppm with respect to the total mass of the solid content. A touch sensor 2 with a pressure sensitive adhesive layer of Example 2 was obtained in the same manner as in Example 1 except that the pressure sensitive adhesive composition 2 was used in place of the pressure sensitive adhesive composition 1, and that the pressure sensitive adhesive composition 2 was applied to a release-treated surface of a release sheet to have a thickness $D_a$ after drying of 50 μm.

Example 3

A pressure sensitive adhesive composition 3 was prepared in the same manner as the preparation method for the pressure sensitive adhesive composition 1 of Example 1 except that the amount of the visible light absorber added was adjusted such that the content of the visible light absorber was 15 mass ppm with respect to the total mass of the solid content. A touch sensor 3 with a pressure sensitive adhesive layer of Example 3 was obtained in the same manner as in Example 1 except that the pressure sensitive adhesive composition 3 was used in place of the pressure sensitive adhesive composition 1.

Example 4

A pressure sensitive adhesive composition 4 was prepared in the same manner as the preparation method for the pressure sensitive adhesive composition 1 of Example 1 except that the amount of the visible light absorber added was adjusted such that the content of the visible light absorber was 150 mass ppm with respect to the total mass of the solid content. A touch sensor 4 with a pressure sensitive adhesive layer of Example 4 was obtained in the same manner as in Example 1 except that the pressure sensitive adhesive composition 4 was used in place of the pressure sensitive adhesive composition 1.

Example 5

A pressure sensitive adhesive composition 5 was prepared in the same manner as the preparation method for the pressure sensitive adhesive composition 1 of Example 1 except that the amount of the visible light absorber added was adjusted such that the content of the visible light absorber was 34 mass ppm with respect to the total mass of the solid content. A touch sensor 5 with a pressure sensitive adhesive layer of Example 5 was obtained in the same manner as in Example 1 except that the pressure sensitive adhesive composition 5 was used in place of the pressure sensitive adhesive composition 1, and that the pressure sensitive adhesive composition 5 was applied to a release-treated surface of a release sheet to have a thickness $D_a$ after drying of 250 μm.

Example 6

A pressure sensitive adhesive composition 6 was prepared in the same manner as the preparation method for the pressure sensitive adhesive composition 5 of Example 5 except that the amount of the visible light absorber added was adjusted such that the content of the visible light absorber was 96 mass ppm with respect to the total mass of the solid content. A touch sensor 6 with a pressure sensitive adhesive layer of Example 6 was obtained in the same manner as in Example 5 except that the pressure sensitive adhesive composition 6 was used in place of the pressure sensitive adhesive composition 5.

Example 7

A pressure sensitive adhesive composition 7 was prepared in the same manner as the preparation method for the pressure sensitive adhesive composition 1 of Example 1 except that the amount of the visible light absorber added was adjusted such that the content of the visible light absorber was 36 mass ppm with respect to the total mass of the solid content. A touch sensor 7 with a pressure sensitive adhesive layer of Example 7 was obtained in the same manner as in Example 1 except that the pressure sensitive adhesive composition 7 was used in place of the pressure sensitive adhesive composition 1, and that the pressure sensitive adhesive composition 7 was applied to a release-treated surface of a release sheet to have a thickness $D_a$ after drying of 400 μm.

Comparative Example 1

A pressure sensitive adhesive composition C1 was prepared in the same manner as the preparation method for the pressure sensitive adhesive composition 1 of Example 1 except that no visible light absorber was added. A touch sensor C1 with a pressure sensitive adhesive layer of Comparative Example 1 was obtained in the same manner as in Example 1 except that the pressure sensitive adhesive composition C1 was used in place of the pressure sensitive adhesive composition 1.

Comparative Example 2

A pressure sensitive adhesive composition C2 was prepared in the same manner as the preparation method for the pressure sensitive adhesive composition 1 of Example 1 except that the amount of the visible light absorber added was adjusted such that the content of the visible light absorber was 4 mass ppm with respect to the total mass of the solid content. A touch sensor C2 with a pressure sensitive adhesive layer of Comparative Example 2 was obtained in the same manner as in Example 1 except that the pressure sensitive adhesive composition C2 was used in place of the pressure sensitive adhesive composition 1.

Comparative Example 3

A pressure sensitive adhesive composition C3 was prepared in the same manner as the preparation method for the pressure sensitive adhesive composition 1 of Example 1 except that the amount of the visible light absorber added was adjusted such that the content of the visible light absorber was 250 mass ppm with respect to the total mass of the solid content. A touch sensor C3 with a pressure sensitive adhesive layer of Comparative Example 3 was obtained in the same manner as in Example 1 except that the pressure sensitive adhesive composition C3 was used in place of the pressure sensitive adhesive composition 1.

Comparative Example 4

A pressure sensitive adhesive composition C4 was prepared in the same manner as the preparation method for the pressure sensitive adhesive composition 5 of Example 5 except that the amount of the visible light absorber added was adjusted such that the content of the visible light absorber was 150 mass ppm with respect to the total mass of the solid content. A touch sensor C4 with a pressure sensitive adhesive layer of Comparative Example 4 was obtained in the same manner as in Example 5 except that the pressure sensitive adhesive composition C4 was used in place of the pressure sensitive adhesive composition 5.

Comparative Example 5

A pressure sensitive adhesive composition C5 was prepared in the same manner as the preparation method for the pressure sensitive adhesive composition 7 of Example 7 except that the amount of the visible light absorber added was adjusted such that the content of the visible light absorber was 12 mass ppm with respect to the total mass of the solid content. A touch sensor C5 with a pressure sensitive adhesive layer of Comparative Example 5 was obtained in the same manner as in Example 7 except that the pressure sensitive adhesive composition C5 was used in place of the pressure sensitive adhesive composition 7.

[Measurement of Thicknesses of Substrate and Pressure Sensitive Adhesive Layer]

The thicknesses of the substrate and the pressure sensitive adhesive layer were measured by the following procedure using a linear gauge (Separate-Type Gauge Head, High-Accuracy Linear Gage "LGH-1010C-B-EH" and Linear Gauge Counter "EH-10S", manufactured by Mitutoyo Corporation).

A support substrate 1 and a support substrate 2 each constituted of a triacetyl cellulose (TAC) film (manufactured by FUJIFILM Corporation, thickness: 40 μm) were prepared. In one of the support substrates, the thickness was measured at nine measurement positions arbitrarily selected. In the other of the support substrates, the thickness was measured at nine measurement positions coinciding, in the surface direction, with the nine measurement positions selected in the one of the support substrates.

The pressure sensitive adhesive layer of the pressure sensitive adhesive sheet in each example was bonded to the support substrates 1 and 2 between the support substrates 1 and 2 to form a composite member for thickness measurement. The thickness of the obtained composite member was measured at the above nine measurement positions, and the thickness of the support substrate 1 and the thickness of the support substrate 2 were subtracted from the thickness of the composite member at each of the nine measurement positions. The arithmetic average value of the obtained nine differences was defined as the thickness $D_a$ of the substrate.

[Measurement of Optical Performance of Pressure Sensitive Adhesive Layer]

The optical performance of the pressure sensitive adhesive layer provided in each example was measured by the following procedure using a spectrophotometer with an integrating sphere unit (ultraviolet-visible spectrophotometer "V-660", integrating sphere unit "ISV-722," manufactured by JASCO Corporation).

A support substrate constituted of a triacetyl cellulose (TAC) film (manufactured by FUJIFILM Corporation, thickness: 40 μm) and a Spectralon standard reflector (standard white plate with case 6916-H422A manufactured by JASCO Corporation) were laminated, and the formed laminate was used as a support white plate. The support white plate formed was placed in the reflectance measurement sample folder of the integrating sphere unit such that measurement light was incident on the support substrate, and the visible light reflectance $\rho_0$ of the support white plate was obtained according to the method described in JIS R 3106: 2019.

The pressure sensitive adhesive layer of the pressure sensitive adhesive sheet manufactured in each of examples and comparative examples was transferred to the support substrate used in the measurement of the visible light reflectance $\rho_0$ to produce a composite member. Further, the obtained composite member and the Spectralon standard reflector were laminated such that the Spectralon standard reflector, the support substrate, and the pressure sensitive adhesive layer were disposed in this order, thus producing a laminate. The laminate produced was placed in the reflectance measurement sample folder of the integrating sphere unit such that measurement light was incident on a surface on the pressure sensitive adhesive layer side, and the measurement and calculation were performed in the same manner as above to obtain the visible light reflectance $\rho_x$ of the laminate.

The internal absorbance $A_a$ of the pressure sensitive adhesive layer was calculated from the obtained visible light reflectance $\rho_0$ of the support white plate and the visible light reflectance $\rho_x$ of the laminate by formula (1) below. The parameter X (m$^{-1}$) was calculated from the calculated internal absorbance $A_a$ and the thickness $D_a$ (m) of the pressure sensitive adhesive layer by formula (2) below.

$$A_a = -\log_{10}\{(\rho_x/\rho_0)^{0.5}\} \quad \text{Formula (1)}:$$

$$X = A_a/D_a \quad \text{Formula (2)}.$$

Table 1 below shows the internal absorbance $A_a$ and the parameter X of each pressure sensitive adhesive layer.

The relative permittivity at a frequency of 100 kHz of the pressure sensitive adhesive layer provided in each of Examples 1 to 7 was measured and as a result was within the range of 2.5 to 3.0.

<Evaluation>

(Preparation of Touch Panel for Evaluation)

In order to strictly compare samples while excluding the influence of individual differences of display elements, a simulated touch panel was produced by the following method.

—Production of Composite Member—

The following members including the touch sensor with a pressure sensitive adhesive layer as obtained in each of examples and comparative examples were bonded to each other to produce a composite member in which the respective members were disposed in the following order.

Glass substrate (thickness: 0.4 mm)
Transparent pressure sensitive adhesive layer (8146-3 manufactured by 3M Japan Limited, thickness: 75 μm)
Touch sensor with a pressure sensitive adhesive layer
TAC film (manufactured by FUJIFILM Corporation, thickness: 40 μm)

The touch sensor with a pressure sensitive adhesive layer was disposed such that the pressure sensitive adhesive layer was in contact with the TAC film.

—Production of Simulated Panel—

Onto a display surface of a 14-inch organic EL panel (manufactured by Samsung Display Co., Ltd., model number "ATNA40CU03"), 0.7 mL of a matching oil (Newton ring inhibitor "HM-30" manufactured by Koyo Chemical Co., Ltd.) was dropped, and the composite member was placed thereon such that the TAC film faces the organic EL panel and air does not enter, thus producing a simulated panel.

It was checked that evaluation values of the simulated panel roughly coincide with those of the actual touch panel product (for example, a touch panel or the like having a member configuration including a glass, a transparent pressure sensitive adhesive layer, a touch sensor, a transparent pressure sensitive adhesive layer, and an organic EL panel in this order) and there is no difference in rank order of evaluation, and then the following evaluation method was adopted as the evaluation method in the implementation form.

—Measurement of Black Display Brightness—

The simulated panel was installed in a dark room without windows such that the display surface faces vertically upward. A black ((R, G, B)=(0, 0, 0)) square image of 80 mm×80 mm was displayed at the screen center of the simulated panel, and a white ((R, G, B)=(255, 255, 255)) image was displayed over the entire region around the black display image. A cylinder (diameter: 60 mm, length: 350 mm) produced by rolling a black cardboard was set up vertically at the screen center of the simulated panel such that the center of the black display image of the simulated panel and the center axis of the cylinder substantially coincide with each other. A spectral radiance meter (CS-3000HDR manufactured by Konica Minolta, Inc.) was set at the tip of the cylinder, and the brightness of the image displayed on the simulated panel was measured under the following measurement conditions and defined as a black display brightness.

(Brightness Meter Measurement Conditions)
Speed mode: FAST
Dark setting: standard
Aperture angle: 1 deg —Measurement of White Display Brightness—

The brightness was measured in the same manner as in the measurement method for a black display brightness except that the image displayed on the simulated panel was an image that was entirely white ((R, G, B)=(255, 255, 255)), and the measured brightness was defined as a white display brightness.

It should be noted that when the brightness was measured in the same manner as described above except that an image obtained by inverting white and black of the image displayed in the measurement of the black display brightness was displayed, the obtained brightness value was the same as the white display brightness measured by displaying the white image on the entire surface.

The measurement results of the black display brightness and the white display brightness of the touch sensor with a pressure sensitive adhesive layer as produced in each of examples and comparative examples are shown in Table 1 below.

When the organic EL panel alone was measured without laminating the composite member, the black display brightness was 0.2 mCd/m$^2$, the white display brightness was 441 Cd/m$^2$, and the contrast ratio (the ratio of the white display brightness to the black display brightness) was 2,210,000.

(Evaluation of Contrast)

From the measurement results of the black display brightness and the white display brightness obtained above, the contrast between black display and white display when black and white display was made was evaluated.

Specifically, the ratio of the measurement value of the white display brightness to the measurement value of the black display brightness was calculated as a contrast ratio, and the contrast of each touch sensor was evaluated from the obtained contrast ratio based on the following criteria.

—Contrast Evaluation Criteria—

"A": The contrast ratio is 900,000 or more.

"B": The contrast ratio is 600,000 or more and less than 900,000.

"C": The contrast ratio is 300,000 or more and less than 600,000.

"D": The contrast ratio is less than 300,000.

(Evaluation of White Display Brightness)

From the measurement result of the white display brightness obtained above, the touch sensor's performance of preventing a decrease in white display brightness was evaluated.

Specifically, from the measurement result of the white display brightness of each simulated panel and the measurement result of the white display brightness when the organic EL panel was used alone, the loss rate of the white display brightness due to the touch sensor was calculated using the following formula, and from the obtained loss rate, the touch sensor's performance of preventing a decrease in white display brightness was evaluated based on the following criteria.

Loss rate of white display brightness (%)=(1−white display brightness of simulated panel/white display brightness of organic EL panel)×100

—Evaluation Criteria for Performance of Preventing Decrease in White Display Brightness—

"A": The loss rate of the white display brightness is 2% or less.

"B": The loss rate of the white display brightness is more than 2% and 4% or less.

"C": The loss rate of the white display brightness is more than 4% and 6% or less.

"D": The loss rate of the white display brightness is more than 6%.

Table 1 shows properties of the pressure sensitive adhesive layer, brightness measurement results, and evaluation results for each example.

The criteria for a touch sensor capable of realizing a high-brightness and high-contrast touch panel are as follows: if the evaluations are each any of A to C, it is an acceptable level, if the evaluations are each A or B, it is a good level, and if the evaluations are each A, it is an excellent level.

TABLE 1

|  |  | Example 1 | Example 2 | Example 3 | Example 4 | Example 5 | Example 6 | Example 7 |
|---|---|---|---|---|---|---|---|---|
| Pressure sensitive adhesive layer | Pressure sensitive adhesive composition No. | 1 | 2 | 3 | 4 | 5 | 6 | 7 |
|  | Content of visible light absorber (mass ppm) | 26 | 16.5 | 15 | 150 | 34 | 96 | 36 |
|  | Thickness $D_a$ (μm) | 150 | 50 | 150 | 150 | 250 | 250 | 400 |
|  | Internal absorbance $A_a$ | 0.005 | 0.002 | 0.003 | 0.025 | 0.010 | 0.026 | 0.016 |
|  | Parameter X (m$^{-1}$) | 33 | 36 | 22 | 164 | 39 | 104 | 40 |
| Measurement of brightness | White display brightness (Cd/m$^2$) | 415 | 418 | 417 | 397 | 411 | 395 | 405 |
|  | Black display brightness (mCd/m$^2$) | 0.6 | 0.4 | 0.8 | 0.4 | 0.8 | 0.6 | 1.1 |
| Evaluation | Contrast ratio Value (×10$^4$) | 69 | 95 | 52 | 90 | 51 | 72 | 39 |
|  | Contrast ratio Rating | B | A | C | A | C | B | C |
|  | Decrease in white display brightness Loss rate (%) | 1.1 | 0.4 | 0.7 | 5.5 | 2.2 | 5.8 | 3.6 |
|  | Decrease in white display brightness Rating | A | A | A | C | B | C | B |

TABLE 2

|  |  | Comparative Example 1 | Comparative Example 2 | Comparative Example 3 | Comparative Example 4 | Comparative Example 5 |
|---|---|---|---|---|---|---|
| Pressure sensitive adhesive layer | Pressure sensitive adhesive composition No. | C1 | C2 | C3 | C4 | C5 |
|  | Content of visible light absorber (mass ppm) | — | 4 | 250 | 150 | 12 |
|  | Thickness Da (μm) | 150 | 150 | 150 | 250 | 400 |
|  | Internal absorbance Aa | 0.001 | 0.002 | 0.040 | 0.040 | 0.006 |
|  | Parameter X (m$^{-1}$) | 6 | 10 | 269 | 161 | 15 |
| Measurement of brightness | White display brightness (Cd/m$^2$) | 420 | 419 | 383 | 383 | 414 |
|  | Black display brightness (mCd/m$^2$) | 2.6 | 1.6 | 0.4 | 0.5 | 2.1 |

TABLE 2-continued

|  |  |  | Comparative Example 1 | Comparative Example 2 | Comparative Example 3 | Comparative Example 4 | Comparative Example 5 |
|---|---|---|---|---|---|---|---|
| Evaluation | Contrast ratio | Value (×10⁴) | 16 | 26 | 87 | 83 | 20 |
|  |  | Rating | D | D | B | B | D |
|  | Decrease in white display brightness | Loss rate (%) | 0.0 | 0.4 | 8.9 | 8.9 | 1.4 |
|  |  | Rating | A | A | D | D | A |

The results in Table 1 verify that the touch sensor with a pressure sensitive adhesive layer according to the present invention in each of Examples 1 to 7 is excellent in contrast between black display and white display and excellent in performance of suppressing a decrease in brightness of white display when the touch sensor with a pressure sensitive adhesive layer is applied to a display device and black and white display is made.

Meanwhile, in the case of the touch sensor with a pressure sensitive adhesive layer of Comparative Examples 1, 2, and 5 in which the parameter X is less than 20 m$^{-1}$, while white display brightness was maintained high, the improvement of the contrast was insufficient.

In addition, in the case of the touch sensor with a pressure sensitive adhesive layer of Comparative Examples 3 and 4 in which the internal absorbance $A_a$ is more than 0.03, the loss of white display brightness was large, and the performance of suppressing a decrease in brightness was insufficient.

The comparison of Examples 2 and 3 and the comparison of Examples 4 and 6 verify that even when the internal absorbance $A_a$ is equivalent, the contrast between black display and white display when black and white display is made is more excellent with smaller thickness $D_a$ of the specific pressure sensitive adhesive layer.

These comparisons verify that when the thickness of the specific pressure sensitive adhesive layer is less than 300 μm, the contrast between black display and white display when black and white display is made can be further improved while suppressing a decrease in brightness of white display, and in addition, when the thickness of the specific pressure sensitive adhesive layer is less than 100 μm, the contrast can be still further improved while suppressing a decrease in brightness of white display.

What is claimed is:

1. A touch sensor with a pressure sensitive adhesive layer, comprising:
   the touch sensor, and
   the pressure sensitive adhesive layer disposed on one surface side of the touch sensor,
   wherein the pressure sensitive adhesive layer includes a visible light absorber, and
   the pressure sensitive adhesive layer has an internal absorbance $A_a$ of 0.0004 to 0.03 and a parameter X of 20 to 3000 m$^{-1}$, the internal absorbance $A_a$ being calculated with Test X,
   Test X: a visible light reflectance $\rho_0$ of a support white plate is obtained by a method described in JIS R 3106:2019; a visible light reflectance $\rho_x$ is obtained by making measurement light incident on a laminate formed by laminating the support white plate and the pressure sensitive adhesive layer from the pressure sensitive adhesive layer side of the laminate by the method described in JIS R 3106:2019; the internal absorbance $A_a$ of the pressure sensitive adhesive layer is calculated from the visible light reflectance $\rho_0$ and the visible light reflectance $\rho_x$ by formula (1), and the parameter X (m$^{-1}$) is calculated from the internal absorbance $A_a$ calculated and a thickness $D_a$ (m) of the pressure sensitive adhesive layer by formula (2), $$A_a = -\log_{10}\{(\rho_x/\rho_0)^{0.5}\} \quad \text{Formula (1)},$$

$$X = A_a/D_a \quad \text{Formula (2)}.$$

2. The touch sensor with the pressure sensitive adhesive layer according to claim 1,
   wherein a thickness of the pressure sensitive adhesive layer is 10 to 300 μm.

3. The touch sensor with the pressure sensitive adhesive layer according to claim 1,
   wherein the visible light absorber is a black pigment, and a content of the black pigment is 5 to 200 mass ppm with respect to a total mass of the pressure sensitive adhesive layer.

4. The touch sensor with the pressure sensitive adhesive layer according to claim 1,
   wherein a thickness of the pressure sensitive adhesive layer is 10 to 300 μm,
   the visible light absorber is a black pigment, and a content of the black pigment is 5 to 200 mass ppm with respect to a total mass of the pressure sensitive adhesive layer.

5. A touch panel comprising the touch sensor with the pressure sensitive adhesive layer according to claim 1.

6. A touch panel comprising the touch sensor with the pressure sensitive adhesive layer according to claim 4.

7. An image display device comprising:
   an image display element; and
   the touch sensor with the pressure sensitive adhesive layer according to claim 1.

8. An image display device comprising:
   an image display element; and
   the touch sensor with the pressure sensitive adhesive layer according to claim 4.

9. The image display device according to claim 7,
   wherein the image display element is an organic electroluminescence display element.

10. The image display device according to claim 8,
    wherein the image display element is an organic electroluminescence display element.

* * * * *